United States Patent
Xu et al.

(10) Patent No.: US 9,309,771 B2
(45) Date of Patent: Apr. 12, 2016

(54) FILM COOLING CHANNEL ARRAY WITH MULTIPLE METERING PORTIONS

(71) Applicant: UNITED TECHNOLOGIES CORPORATION, Farmington, CT (US)

(72) Inventors: JinQuan Xu, Groton, CT (US); Glenn Levasseur, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 396 days.

(21) Appl. No.: 13/660,132

(22) Filed: Oct. 25, 2012

(65) Prior Publication Data

US 2014/0119944 A1    May 1, 2014

(51) Int. Cl.
F01D 5/18    (2006.01)

(52) U.S. Cl.
CPC .......... *F01D 5/186* (2013.01); *F05D 2260/202* (2013.01); *Y02T 50/676* (2013.01)

(58) Field of Classification Search
CPC ............... F01D 5/186; F05B 2260/202; F05B 2260/203
See application file for complete search history.

(56) References Cited

U.S. PATENT DOCUMENTS

| 4,705,455 | A | 11/1987 | Sahm et al. | |
| 5,062,768 | A | 11/1991 | Marriage | |
| 5,326,224 | A | 7/1994 | Lee et al. | |
| 5,419,681 | A * | 5/1995 | Lee | 416/97 R |
| 6,092,982 | A | 7/2000 | Ikeda et al. | |
| 6,183,199 | B1 * | 2/2001 | Beeck et al. | 416/97 R |
| 7,328,580 | B2 | 2/2008 | Lee et al. | |
| 7,374,401 | B2 | 5/2008 | Lee | |
| 7,563,073 | B1 * | 7/2009 | Liang | 416/97 R |
| 8,057,181 | B1 * | 11/2011 | Liang | 416/97 R |
| 8,079,810 | B2 | 12/2011 | Liang | |
| 8,128,366 | B2 | 3/2012 | Strock et al. | |
| 8,905,713 | B2 * | 12/2014 | Bunker | F01D 5/186 416/97 R |
| 2008/0003096 | A1 * | 1/2008 | Kohli et al. | 415/115 |
| 2008/0279697 | A1 * | 11/2008 | Liang | F01D 5/186 416/97 R |
| 2013/0175015 | A1 * | 7/2013 | Tanaka et al. | 165/168 |

OTHER PUBLICATIONS

International Search Report and Written Opinion for related International Application No. PCT/US13/57040; report dated May 12, 2014.

* cited by examiner

*Primary Examiner* — Richard Edgar
(74) *Attorney, Agent, or Firm* — Cantor Colburn LLP

(57) ABSTRACT

A cooling channel array for a gas turbine engine is provided. The cooling channel array is carried by a component wall having an inner surface and an outer surface and comprises at least two metering portions that communicate with a diffusion cavity.

19 Claims, 3 Drawing Sheets

FILM COOLING CHANNEL ARRAY WITH MULTIPLE METERING PORTIONS

TECHNICAL FIELD

The subject matter of the present disclosure relates generally to film cooling. More particularly, the subject matter of the present disclosure relates to a film cooling channel array with multiple metering portions for cooling surfaces within gas turbine engines.

BACKGROUND

Gas turbine engines such as those used on jet aircraft generally comprise an air inlet, a single or multi-stage compressor, a combustion chamber aft of the compressor, a single or multi-stage turbine, and an exhaust nozzle. Air entering the inlet flows through the compressor and into the combustion chamber where it provides oxygen for fuel combustion. The hot combustion gases pass through the turbine and exit the exhaust nozzle, providing thrust.

Modern gas turbine engines employ very high working temperatures in order to increase engine operating efficiency. These high temperatures pose a risk of damage to engine components such as combustor liners, turbine blades and vanes, and blade outer air seals (BOAS). High melting point super-alloys and thermal bather coatings have been used to avoid thermally induced damage, but operating temperatures can still exceed super-alloy melting points, and coatings can become damaged or otherwise fail over time.

Cooling fluids also may be used to protect engine components exposed to high temperature. One method of using cooling fluids is impingement cooling, which involves directing a relatively cool fluid, such as compressor bleed air, against a surface of a component exposed to high temperatures in order to absorb thermal energy from the component into the cooling fluid. Another method of using cooling fluids is called film cooling. Film cooling involves providing a flow of relatively cool fluid from film cooling holes within the component in order to create a thermally insulative barrier between a surface of the component and a relatively hot fluid flow.

For example, turbine blades may be equipped with cooling holes along the turbine blade perimeter. Cooling air from, say, a compressor bleed system may be ejected through the holes to provide a thermally insulative barrier along a portion of the blade.

A difficulty exists in maintaining a steady film of cooling air across the surface to be cooled. For example, cooling holes can create a vortex of cooling air that draws the hot air against the surface to be cooled instead of away from the surface.

Thus there is a consistent need for an improved film cooling system that provides a steady film of cooling air across the surface to be cooled. There is also a need for a film cooling channel array that provides a wider/thinner film of cooling fluid to reduce cooling fluid usage, maximize cooling efficiency and reduce engine fuel consumption.

SUMMARY

According to one embodiment of the invention, a cooling channel array carried by a component wall of a gas turbine engine is provided. The component wall has a first surface and a second surface. The cooling channel array comprises a diffusion cavity and at least two metering portions that merge into (are in fluid communication with) the diffusion cavity. The diffusion cavity is defined by a face carried by the component wall and has an outlet on the second surface. Each metering portion extends from an inlet located on the first surface to a metering portion outlet located on the face of the diffusion cavity. The diffusion cavity outlet is further defined by a rounded triangular perimeter comprising a relatively straight trailing edge and two opposing lateral edges that extend from each end of the trailing edge and converge at an apex. The component wall may be part of, for example and without limitation, a turbine blade, turbine vane or blade outer air seal.

Each metering portion may have a constant flow cross-sectional area. The cross-sectional area may be circular, oval or any suitable shape.

In a refinement, each metering portion has a length at least three times the metering portion diameter.

In another refinement, the diffusion cavity defines an axis such as a central axis running through the center of the diffusion cavity, and the diffusion cavity is configured to diffuse cooling air away from the central axis in a lateral direction before the air exits the cooling channel array.

The metering portions may or may not be substantially parallel to each other. The metering portions may or may not have different diameters.

In another embodiment of the invention a cooling channel array carried by a component wall for a gas turbine engine is provided, the component wall comprising a first surface and a second surface, the cooling channel array comprising at least two metering portions that communicate with a diffusion cavity. The diffusion cavity is defined by a face carried by the component wall and has an outlet on the second surface. The diffusion cavity comprises two or more lobes, wherein each lobe is partly defined by a raised, contoured bottom surface which forms part of the face of the diffusion cavity. Each metering portion extends from an inlet located on the first surface to a metering portion outlet located on the face of the diffusion cavity. The number of metering portions may equal the number of lobes.

In a refinement, the diffusion cavity defines a central axis and at least one of the lobes defines an axis substantially parallel to the central axis.

In an alternative refinement the diffusion cavity defines a central axis and at least one of the lobes defines an axis that diverges from the central axis.

In another refinement the diffusion cavity outlet is further defined by a perimeter comprising a relatively straight trailing edge. One lobe is at least partly defined by a side surface and a lower side surface and terminates at the trailing edge, and the other lobe is at least partly defined by an opposing side surface and a lower side surface and terminates at the trailing edge.

In another refinement each lobe defines a lobe axis and each metering portion is fluidly aligned with a lobe axis.

BRIEF DESCRIPTION OF THE DRAWINGS

So that the manner in which the above recited concepts of the present disclosure may be understood in detail, a more particular description is provided by reference to the embodiments which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

The present invention is an improved film cooling system for use in gas turbine engines and in other applications. The film cooling system comprises a multiple cooling channel arrays, with at least one cooling channel array comprising multiple metering portions and a diffusion cavity. The cooling channel array may be carried by (located within) any component wall that needs to be cooled.

Although the cooling system of the present invention will now be described with regard to a turbine blade cooling system, it should be understood that the cooling system may be used to cool any suitable gas turbine engine component that requires cooling, including but not limited to combustors, turbine blades and vanes, blade outer air seals (BOAS) and augmentors. Further, although the cooling system is described as using cooling air from the compressor, it should be understood that the system can be used with any suitable cooling fluid, including relatively cooler air from elsewhere in the engine or steam.

Figure 1:
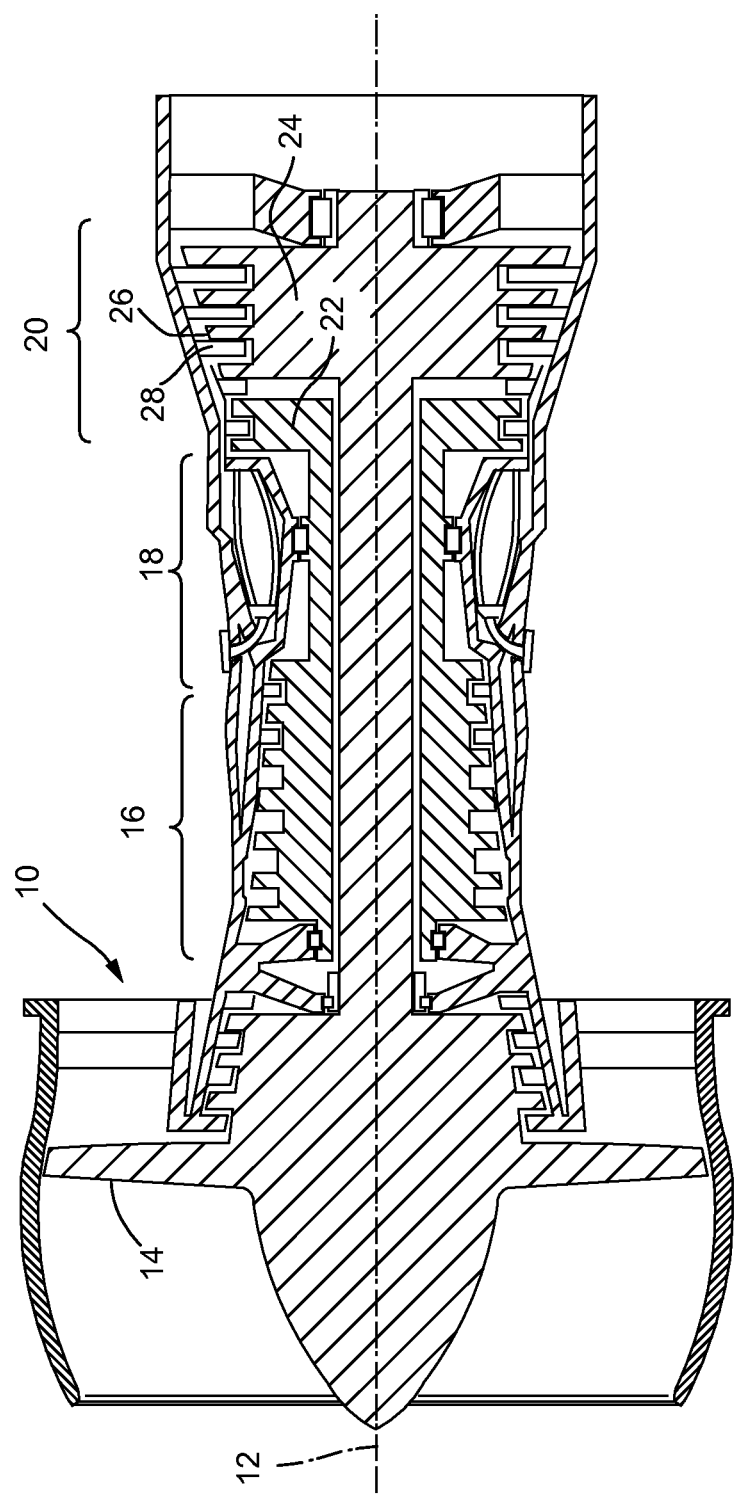
FIG. 1 is a longitudinal sectional view of an exemplary gas turbine engine that may be equipped with the film cooling system of the present invention.

FIG. 1 is a longitudinal sectional view of an exemplary gas turbine engine 10 that may be equipped with the film cooling system of the present invention. The engine 10 is circumferentially disposed about a center line 12 and comprises a fan 14, a compressor 16, a combustion chamber or combustor 18 and a turbine 20 that provides rotational power to the fan 14 and compressor 16. Air entering the engine 10 travels into the compressor 16 where it undergoes compression, then into the combustion chamber 18 where it is mixed with fuel and ignited to produce hot combustion gases which pass through the turbine 20. The turbine includes high and low pressure rotors 22, 24 that, in response to the expansion and flow of the combustion gases, rotate, driving the compressor 16 and fan 14. The gases exit through the exhaust nozzle to provide engine thrust. A significant amount of thrust may be provided by a bypass flow path due to a high bypass ratio. In some engines the turbine 20 drives the fan 14 through a geared architecture (not shown) to achieve a high bypass ratio and reduced thrust specific fuel consumption.

Figure 2:
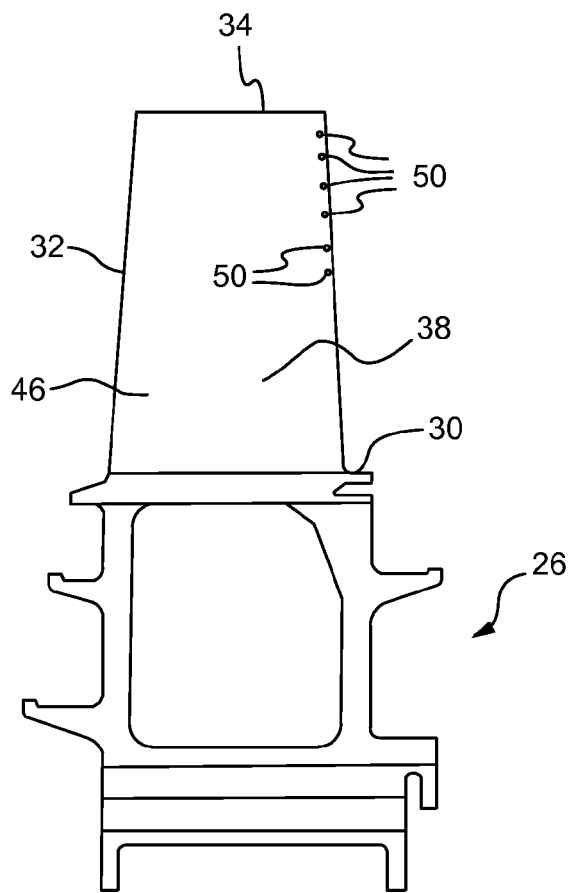
FIG. 2 is a view of a single turbine blade.

The turbine 20 comprises alternating rows of rotary blades 26 and static vanes 28. FIG. 2 is a view of a single turbine blade 26. The turbine blade 26 comprises a platform 30 and a generally curved airfoil 32 extending radially from the platform 30. The airfoil 32 may be protected from heat generated in the combustion chamber 18 via a thermal barrier coating.

Figure 3:
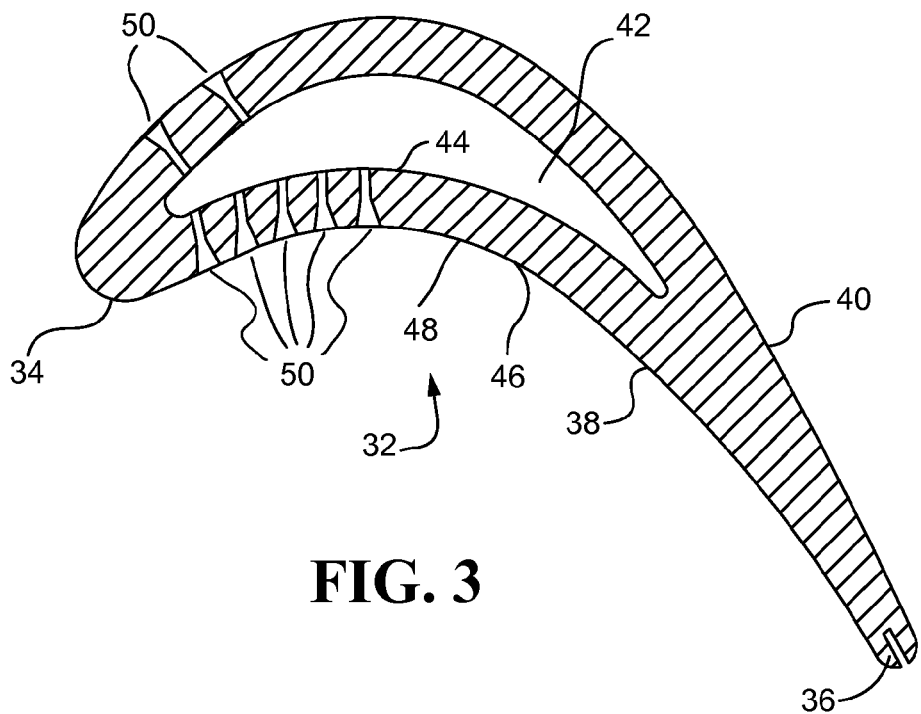
FIG. 3 is a cross-sectional view of the turbine blade of FIG. 2.

FIG. 3 is a cross-sectional view of the airfoil 32 of FIG. 2. The airfoil 32 has a leading edge 34, a trailing edge 36, a pressure side 38 and a suction side 40. The airfoil 32 is subjected to very high temperatures which require cooling, with the pressure side 38 typically contacting hotter gases than the suction side 40. The blade airfoil 32 may be at least partially hollow, and may include one or more channels 42 through which cooling air may pass before exiting through numerous cooling channel arrays 50. The number and location of the cooling channel arrays 50 may vary.

The airfoil 32 may be formed from a super-alloy or any suitable material, and may be covered in a thermal barrier coating to aid in the cooling. In the airfoil 32 shown in FIG. 3, a portion of the pressure side 38 is formed by a component wall 48 having a first surface 44, for example, an inner, channel facing, surface, a second surface 46, for example, a generally concave outer surface. The generally concave outer surface 46 of the wall 48 is exposed to hot gases from the combustion chamber. The component wall 48 carries a plurality of cooling channel arrays 50, five of which are shown.

Figure 4:
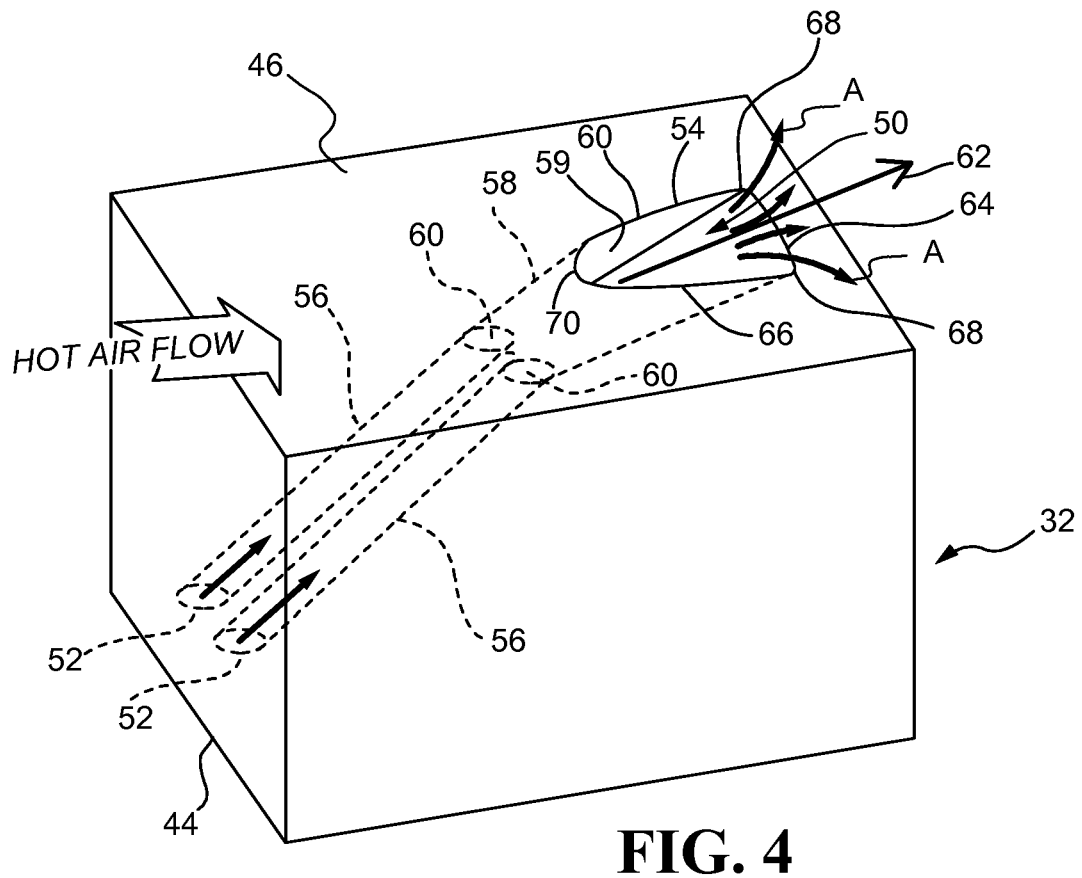
FIG. 4 is a view of a cooling channel array formed within the wall of a turbine blade.

FIG. 4 is an example of a cooling channel array 50 carried by (formed within) the component wall 48 of the airfoil 32. The cooling channel array 50 comprises a diffusion cavity 58 and a metering section. Typically, cooling air from a cooling air source such as bleed air from the compressor 16 flows through the cooling channel arrays 50 to provide a thermally insulative film barrier along a portion of the airfoil 32.

The metering section comprises multiple metering portions 56 that merge into (are in fluid communication with) the diffusion cavity 58. Each metering portion 56 extends from a metering portion inlet 52 located on the first surface 44 downstream (in the direction of cooling air flow) of a metering portion outlet 60 located on the face 59 of the diffusion cavity 58. The metering portions 56 control (meter) the flow of air through the cooling channel array 50 from the cooling air source to the hot outer surface 46 that needs to be cooled. Each metering portion 56 may have a constant flow cross-sectional area from its inlet 52 to its outlet 60, where the constant flow cross-sectional area is defined as the area of a planar surface normal to the longitudinal axis of the metering portion 56. Although as shown in FIG. 4 the multiple metering portions 56 have multiple inlets 52, the multiple metering portions 56 may extend from one single inlet.

The inlets 52, and thus the metering portions 56, may have any suitable flow cross-sectional area, including but not limited to circular, oval, crescent, elliptical and racetrack (oval with two parallel straight sides). For example and without limitation, the metering portions 56 shown in FIG. 4 have circular flow cross-sectional areas. The length of each metering portion 56 preferably is at least three times the diameter (or a hydraulic diameter if the cross section is not circular) of each metering portion 56.

The diffusion cavity 58 is adjacent to and downstream of the metering portions 56 and defines an axis such as a central axis 62 which runs through the center of the diffusion cavity 58 substantially in the direction of cooling fluid flow. The diffusion cavity 58 is defined by a face 59 carried by the component wall 48 and has an outlet 54 on the second (cooled) surface 46. The face 59 may be generally concave. Some cooling air diffuses within the diffusion cavity 58 away from the central axis 62 in a lateral direction before exiting the cooling channel array 50 through the outlet 54 as indicated by the arrows A. This diffuse pattern helps generate a broad layer of cooling air across the hot, outer surface 46 of the airfoil 32.

In the embodiment illustrated in FIG. 4, the outlet 54 has a roughly triangular perimeter shape comprising a trailing edge 64 and two opposing lateral edges 66 that extend from each end 68 of the trailing edge and converge at a leading apex 70.

The multiple metering portions 56 may be parallel as shown in FIG. 2 or may not be parallel. The multiple metering portions 56 may also differ in diameter.

It is believed that a cooling channel array with multiple metering portions can have a wider lateral cooling air coverage compared to cooling channel arrays with a single metering portion. Also, it is believed that a cooling channel array having multiple metering portions of substantially the same length but each with a smaller cross-sectional area than the metering portion of a conventional, single metering portion cooling channel array will provide better flow conditioning in the metering portion. Such an arrangement may be particularly useful for industrial gas turbine engine cooling where the cooling channel arrays are typically larger. It is also believed that a multiple metering portion cooling channel array will add additional anti-vortex benefits.

Figure 5:
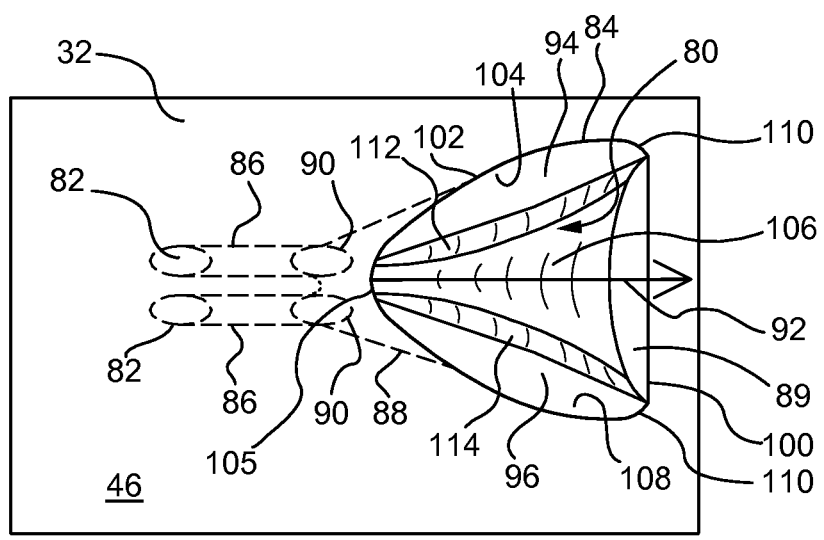
FIG. 5 is a top plan view of an alternative embodiment of a cooling channel array formed within the wall of a turbine blade.

FIG. 5 is a top plan view of an alternative embodiment of a cooling channel array 80. The cooling channel array 80 comprises a diffusion cavity 88 and a metering section having two metering portions 86. As in the embodiment of FIG. 4, each metering portion 86 extends from an inlet 82 located on the component wall first surface 44 and extends downstream (in the direction of cooling air flow) from the inlet 82 to a metering portion outlet 90 located on the face 89 of the diffusion cavity 88. The cooling air from the metering portions 86 combines as it enters the diffusion cavity 88. Each metering portion 86 may have a constant flow cross-sectional area from the metering portion inlet 82 to the metering portion outlet 90. Alternatively, the flow cross-sectional areas of one or both metering portions 86 may decrease or increase from the metering portion inlet 82 to the metering portion outlet 90. The multiple metering portions 56 may also differ from each other in diameter.

The diffusion cavity 88 is in fluid communication with and is downstream of the metering portions 86 and extends from the metering portion outlets 90 to the diffusion cavity outlet 84 located on the second surface 46 of the component wall. The diffusion cavity 88 is defined by a face 89 carried by the component wall. The face 89 may include opposing side surfaces 104 and 108 and a raised contoured bottom surface 106 which is described in more detail below. The diffusion cavity 88 defines an axis such as a central axis 92 which runs through the center of the diffusion cavity 88 substantially in the direction of cooling fluid flow. Cooling air diffuses within the diffusion cavity 88 away from the central axis 92 before exiting the cooling channel array 80 through the diffusion cavity outlet 84.

The diffusion cavity outlet 84 may have a roughly triangular perimeter comprising a relatively straight trailing edge 100 and two slightly arcuate opposing lateral edges 102 that extend from each end 110 of the trailing edge 100 and converge at an apex 105.

Unlike the embodiment of FIG. 4, the diffusion cavity 88 includes a raised, contoured bottom surface 106 located generally between the opposing side surfaces 104, 108 and away from (upstream of) the diffusion cavity outlet 84 that helps define two or more lobes, 94, 96. The lobes 94, 96 are channel-like spaces through which the cooling air may flow. The lobes 94, 96 are not entirely distinct, but rather meld together to form the diffusion cavity 88. The lobes 94, 96 may define axes that run substantially parallel to the central axis 92 or may diverge from the central axis 92 as they approach the trailing edge 100. The raised contoured bottom surface 106 may be symmetrical or asymmetrical with respect to the central axis 92 and may have its maximum convexity at the central axis 92. The raised contoured bottom surface 106 may comprise two slightly convex (when viewed from the vantage point of the cooling channel array outlet 84) lower side surfaces 112, 114 that meet at the central axis 92 as disclosed in co-owned U.S. patent application Ser. No. 13/544,090, incorporated herein by reference.

The lobes 94, 96 generally are defined by their surrounding surfaces. For example, lobe 94 is at least partly defined by the side surface 104 and the lower side surface 112 and terminates at the trailing edge 100. Similarly, lobe 96 is at least partly defined by the other side surface 108 and the other lower side surface 114 and terminates at the trailing edge 100. The multiple lobes help prevent the creation of vortices in the flowing air, and thus help maintain a steady flow of cooling air across the surface of the airfoil 32.

The multi-lobed multi-metering portion cooling channel array may comprise two, three or more lobes. Typically the number of the metering portions is equal to the number of lobes, but the number of metering portions can be different from the number of lobes.

The multiple metering portions 86 may be parallel to each other as shown in FIG. 5 or may not be parallel. For example, each metering portion 86 may be fluidly aligned with the axis of a corresponding lobe 94, 96. Also, it may be advantageous to align the metering portions 86 with the curved side surfaces 104, 108 of the diffusion cavity 88. The multiple metering portions 86 may be selectively angled—with respect to each other and with respect to the diffusion cavity 88—to tailor fluid flow to the cooling requirements of the surface 46 being cooled. Multiple metering holes can be added, for example, a third metering hole or more, to be used in cooling channel arrays having three or more lobes. The length, diameter and angle of the metering holes can be varied to achieve desired cooling effectiveness.

Applications

The cooling system of the present invention may be used in gas turbine engines or any engine where surfaces can be cooled via film cooling. The cooling system may be useful in industrial engines and other applications that use large airfoils to enhance design flexibility.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A cooling channel array carried by a component wall of a gas turbine engine, the component wall having a first surface and a second surface, the cooling channel array comprising:
   a diffusion cavity defined by a face carried by the component wall, the diffusion cavity defining a central axis and having an outlet on the second surface, the face having at least two side surfaces;
   a metering section comprising at least two metering portions that merge into the diffusion cavity, each metering portion extending from an inlet located on the first surface to a metering portion outlet located on the face of the diffusion cavity;
   a convex raised contoured bottom surface on the face of the diffusion cavity, between the side surfaces, and below the second surface, the raised contoured surface forming a corner with the face and being separated from the second surface by the face; and
   at least two slightly convex lower side surfaces, each slightly convex lower side surface being between the convex raised contoured bottom surface and one of the side surfaces of the face, respectively forming a straight groove with one of the side surfaces of the face, and respectively forming a curved edge with the convex raised contoured bottom surface, each curved edge curving convexly toward the central axis.

2. The cooling channel array of claim 1 wherein at least one of the metering portions has a constant flow cross-sectional area.

3. The cooling channel array of claim 1 wherein at least one of the metering portions has a circular flow cross-sectional area.

4. The cooling channel array of claim 3 wherein:
   each metering portion has a diameter and a length at least three times the diameter.

5. The cooling channel array of claim 1 wherein at least one of the metering portions has an oval flow cross-sectional area.

6. The cooling channel array of claim 1 wherein:
   the diffusion cavity is downstream of the metering portions; and
   the diffusion cavity is configured to diffuse cooling air away from the central axis in a lateral direction before the air exits the cooling channel array.

7. The cooling channel array of claim 1 wherein the diffusion cavity outlet is defined by a rounded triangular perimeter comprising a relatively straight trailing edge and two opposing lateral edges that extend from each end of the trailing edge and converge at an apex.

8. The cooling channel array of claim 1 wherein the metering portions are substantially parallel to each other.

9. The cooling channel array of claim 1 wherein the metering portions are not parallel to each other.

10. The cooling channel array of claim 1 wherein at least two metering portions have different diameters.

11. The cooling channel array of claim 1 wherein the component wall is part of a turbine blade.

12. The cooling channel array of claim 1 wherein the diffusion cavity comprises two or more lobes.

13. The cooling channel array of claim 12 wherein the number of metering portions is equal to the number of lobes.

14. A cooling channel array carried by a component wall of a gas turbine engine, the component wall having a first surface and a second surface, the cooling channel array comprising:
   a diffusion cavity defined by a face carried by the component wall, the diffusion cavity defining a central axis and having an outlet on the second surface, the face having at least two side surfaces;
   a convex raised contoured bottom surface in the diffusion cavity on the face and below the second surface, the raised contoured bottom surface forming a corner with the face, being separated from the second surface by the face;
   at least two slightly convex lower side surfaces, each slightly convex lower side surface being between the convex raised contoured bottom surface and one of the side surfaces of the face, respectively forming a straight groove with one of the side surfaces of the face, and respectively forming a curved edge with the convex raised contoured bottom surface, each curved edge curving convexly toward the central axis; and
   a metering section comprising at least two metering portions that communicate with the diffusion cavity, each metering portion extending from an inlet located on the first surface to a metering portion outlet located on the face of the diffusion cavity; wherein
   the diffusion cavity comprises two or more lobes, each lobe partly defined by the convex raised contoured bottom surface.

15. The cooling channel array of claim 14 wherein:
   at least one of the lobes defines a lobe axis that diverges from the central axis.

16. The cooling channel array of claim 14 wherein:
   the diffusion cavity outlet is defined by a perimeter having a relatively straight trailing edge;
   one lobe is at least partly defined by one of the side surfaces and one of the slightly convex lower side surfaces and terminates at the trailing edge; and
   the other lobe is at least partly defined by the other side surface and the other slightly convex lower side surface and terminates at the trailing edge.

17. The cooling channel array of claim 14 wherein the number of metering portions equals the number of lobes.

18. The cooling channel array of claim 17 wherein the number of metering portions is two.

19. The cooling channel array of claim 17 wherein each lobe defines a lobe axis and each metering portion is fluidly aligned with a lobe axis.

\* \* \* \* \*